United States Patent
Schmidt

(10) Patent No.: US 10,242,454 B2
(45) Date of Patent: Mar. 26, 2019

(54) SYSTEM FOR DEPTH DATA FILTERING BASED ON AMPLITUDE ENERGY VALUES

(71) Applicant: Google Inc., Mountain View, CA (US)

(72) Inventor: Mirko Schmidt, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 21 days.

(21) Appl. No.: 15/415,724

(22) Filed: Jan. 25, 2017

(65) Prior Publication Data
US 2018/0211398 A1    Jul. 26, 2018

(51) Int. Cl.
| | |
|---|---|
| *G06T 5/00* | (2006.01) |
| *G01S 17/42* | (2006.01) |
| *G01S 17/87* | (2006.01) |
| *G01S 17/89* | (2006.01) |
| *G01S 7/487* | (2006.01) |
| *G01S 7/493* | (2006.01) |
| *G06T 19/00* | (2011.01) |
| *G06T 7/514* | (2017.01) |

(52) U.S. Cl.
CPC .......... *G06T 7/514* (2017.01); *G01S 7/4873* (2013.01); *G01S 7/493* (2013.01); *G01S 17/42* (2013.01); *G01S 17/87* (2013.01); *G01S 17/89* (2013.01); *G06T 5/002* (2013.01); *G06T 19/006* (2013.01); *G06T 2207/10012* (2013.01); *G06T 2207/10028* (2013.01)

(58) Field of Classification Search
None
See application file for complete search history.

(56) References Cited

U.S. PATENT DOCUMENTS

| | | |
|---|---|---|
| 5,966,678 A | 10/1999 | Lam |
| 7,408,627 B2 | 8/2008 | Bamji et al. |
| 2003/0117412 A1 | 6/2003 | Brooksby et al. |
| 2015/0002734 A1* | 1/2015 | Lee ............ H04N 5/2256 348/367 |
| 2015/0193938 A1* | 7/2015 | Freedman ............ G01S 17/89 382/154 |

OTHER PUBLICATIONS

International Search Report and Written Opinion dated Feb. 2, 2018 for PCT Application No. PCT/US2017/059184, 15 pages.

(Continued)

*Primary Examiner* — Idowu O Osifade

(57) ABSTRACT

An electronic device includes a time of flight (ToF) camera and one or more processors. The ToF camera captures raw depth images. The processors determine a depth frame and an amplitude frame from the raw depth images. The depth frame comprises an array of pixels, each pixel having a depth value. The amplitude frame comprises an array of pixels, each pixel having an amplitude energy value. The processors determine a first energy threshold value based on the amplitude energy values of the array of pixels of the amplitude frame and determine, for the depth value of a first pixel of the depth frame, a confidence value representing a corresponding validity of a depth represented by the depth value, based on a comparison of the amplitude energy value of a corresponding first pixel of the amplitude frame to the first energy threshold value.

22 Claims, 8 Drawing Sheets

(56) References Cited

OTHER PUBLICATIONS

"People Counting for Demand Controlled Ventilation Using 3D Time-of-Flight (ToF) Reference Design", Texas Instruments Incorporated, TIDUBL5A, Apr. 2016, 58 pages.
Written Opinion of the International Preliminary Examining Authority dated Dec. 12, 2018 for corresponding International Application No. PCT/US2017/059184, 8 pages.

* cited by examiner

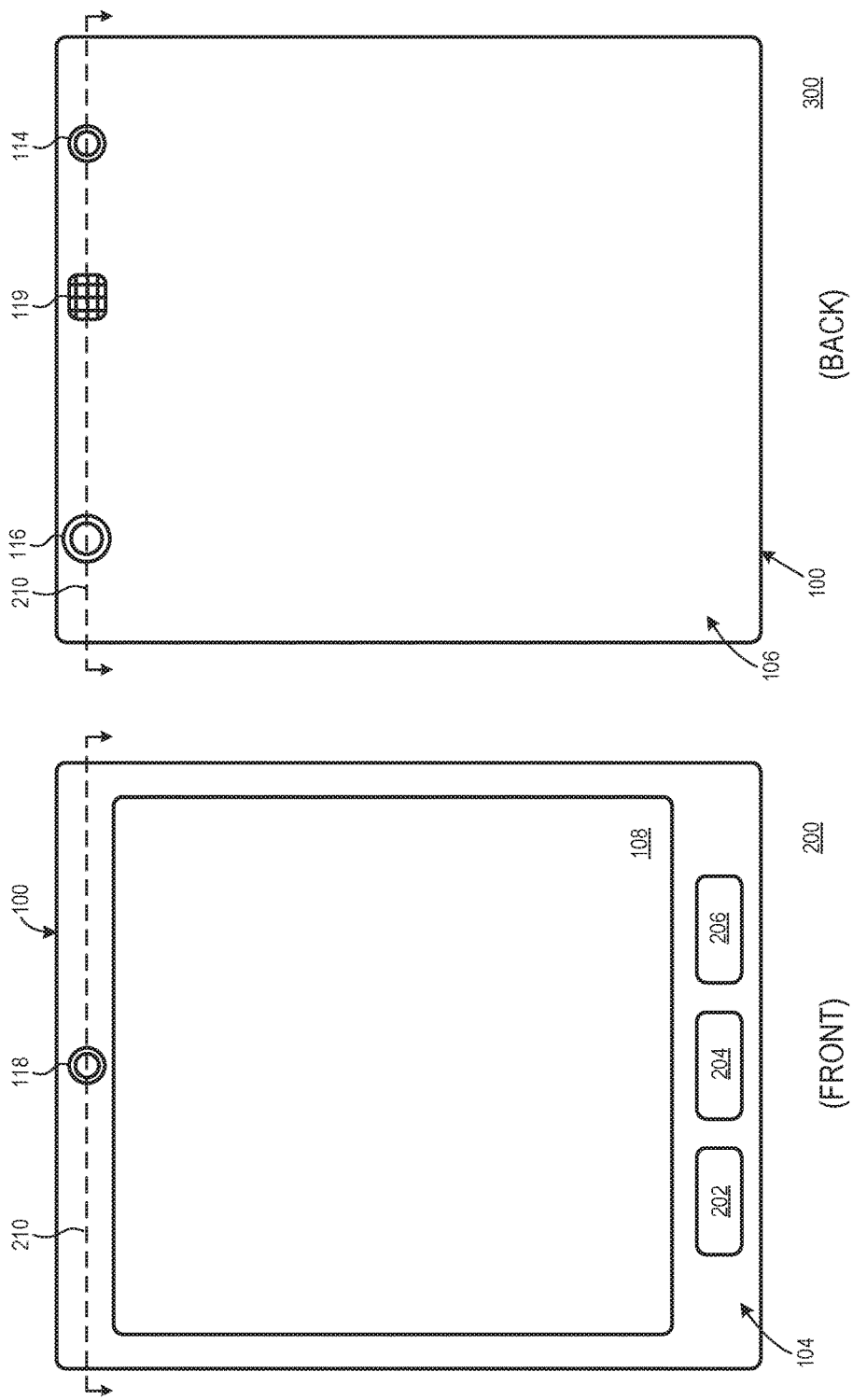

FIG. 7

| R1 | R2 | R3 | R4 |
| R2 | R3 | R4 | R4 |
| R2 | R3 | R4 | R5 |
| R3 | R4 | R5 | R5 |

FIG. 8

| A1 | A2 | A3 | A4 |
| A2 | A3 | A4 | A4 |
| A2 | A3 | A4 | A5 |
| A3 | A4 | A5 | A5 |

FIG. 9

| D1 | D2 | D3 | D4 |
| D2 | D3 | D4 | D4 |
| D2 | D3 | D4 | D5 |
| D3 | D4 | D5 | D5 |

FIG. 10

| C1 | C1 | C2 | C2 |
| C1 | C2 | C2 | C2 |
| C1 | C2 | C2 | C2 |
| C2 | C2 | C2 | C2 |

SYSTEM FOR DEPTH DATA FILTERING BASED ON AMPLITUDE ENERGY VALUES

FIELD OF THE DISCLOSURE

The present disclosure relates generally to image capture and processing and more particularly to machine vision using captured imagery.

BACKGROUND

Machine vision techniques, such as simultaneous localization and mapping (SLAM), augmented reality (AR), and virtual reality (VR), often rely on the identification of objects within the local environment of a device through the analysis of imagery of the local environment captured by the device. Three-Dimensional (3D) Time-of-Flight (ToF) cameras use an active illumination which is modulated in time to determine the distance of an object. The illumination received by the object falls off with the square of its distance from the light source. For this reason, objects closer to the camera appear much brighter than objects farther away from the camera.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

FIG. 2 is a diagram illustrating a front plan view of an electronic device implementing multiple imaging cameras and a depth sensor in accordance with at least one embodiment of the present disclosure.

FIG. 3 is a diagram illustrating a back plan view of the electronic device of FIG. 2 in accordance with at least one embodiment of the present disclosure.

FIG. 7 is a diagram illustrating a representation of an array of raw data pixels in accordance with at least one embodiment of the present disclosure.

FIG. 8 is a diagram illustrating a representation of an amplitude frame in accordance with at least one embodiment of the present disclosure.

FIG. 9 is a diagram illustrating a representation of a depth array in accordance with at least one embodiment of the present disclosure.

FIG. 10 is a diagram illustrating a representation of a confidence value array in accordance with at least one embodiment of the present disclosure.

DETAILED DESCRIPTION

Figure 1:
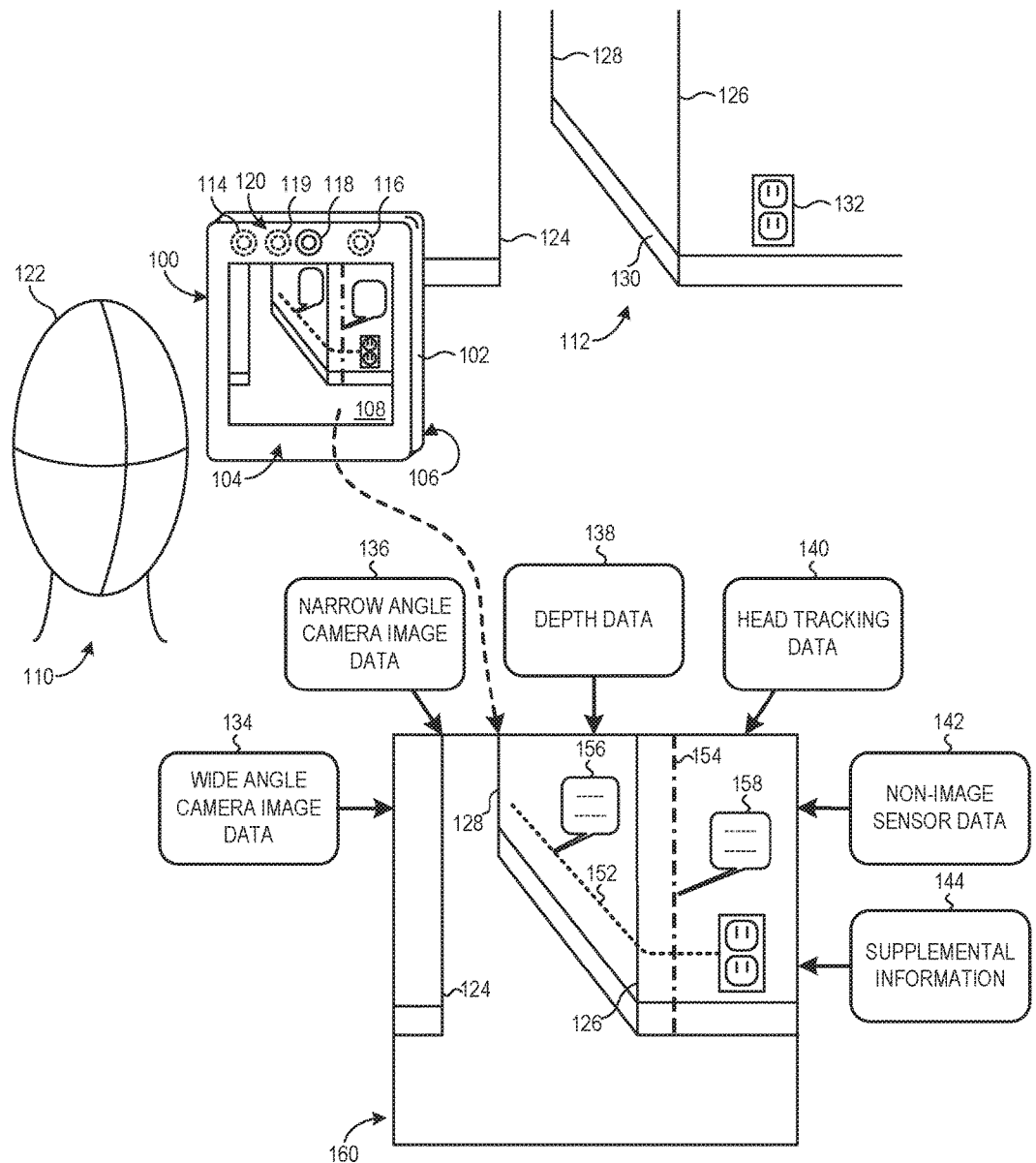
FIG. 1 is a diagram illustrating an electronic device configured to determine a relative position/orientation in a local environment using image sensor data and non-image sensor data in accordance with at least one embodiment of the present disclosure.

The following description is intended to convey a thorough understanding of the present disclosure by providing a number of specific embodiments and details involving dynamically parameterizing and applying a filter for invalidating depth data affected by light distortion for image-based identification of objects in a local environment of an electronic device. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-12 illustrate various techniques for utilizing an amplitude frame of depth data captured by a Time-of-Flight (ToF) camera to dynamically parameterize and apply a filter for characterizing depth data affected by light distortion. A ToF camera uses an active illumination modulated in time to determine the distance of an object. The illumination received by the object falls off with the square of its distance from the light source. For this reason, objects closer to the camera appear much brighter than objects farther away from the camera. In addition, an optical system utilized to image a physical scene onto a ToF system typically generates stray light artifacts. (A ToF system may be referred to as a depth sensor herein.) In particular, any one point in the physical scene casts light onto not only a single pixel of the ToF camera but onto a group of pixels of the ToF camera. The group of pixels which is illuminated by a point-like source is described by the point spread function (PSF).

When imaging multiple objects simultaneously with a ToF system, the objects' reflection is brighter or darker based on their proximity to the ToF camera. The PSF of a bright object (i.e., object closer to the ToF camera) can extend into the image region of a darker object (i.e., object farther from the ToF camera). The signals detected for a darker object thus are superimposed by an attenuated copy of a bright object's signal, making the dark object appear brighter. Accordingly, the darker object's signal is polluted and reconstructed depth data will show significant distortions from reality with the polluted signal of the darker object making it appear that the darker object is located at a distance to the ToF camera different than it is in reality. While the described effect is symmetric, such that that a dark object also influences a bright object's signals, in this case the effect does not result to the same significant distortions.

The example systems and techniques described herein propose characterizing regions of an image which are potentially distorted. For example, one described methodology proposes characterizing as invalid and thereafter invalidating dark regions of an image which are potentially distorted by superimposed signals from bright image regions. The invalidation of dark regions avoids accumulating incorrect data, ensuring a greater percentage of valid data (i.e., more valid data) is available for other applications such as augmented reality (AR) functionality, automotive safety functionality, machine vision functionality or other simultaneous localization and mapping (SLAM) functionality, and the like.

One or more embodiments described herein dynamically estimate the total illumination energy incident on a depth sensor in order to compute how dark regions in an image frame are affected. In this manner, the proposed methodology is able to effectively characterize and suppress artifacts caused by large PSFs which affect regions of the image.

One or more raw depth images are captured using a time-of-flight camera of an electronic device. A depth frame is determined from the one or more raw depth images with the depth frame comprising an array of pixels having depth values. An amplitude frame is determined from the one or more raw depth images with the amplitude frame comprising an array of pixels having amplitude energy values. A first threshold value is determined based on the amplitude energy values of the amplitude frame. A confidence value representing a corresponding validity of a depth represented by a first pixel of the depth frame is determined based on a comparison of the amplitude energy value of a corresponding first pixel of the amplitude frame to the first threshold. The confidence value, which represents whether the pixel from the depth frame/amplitude frame is to be used to determine a depth of a corresponding spatial feature/can be used to filter/screen pixels of the amplitude frame.

In some embodiments, the electronic device includes two or more imaging cameras and a ToF depth sensor disposed at a surface. The two or more imaging cameras may be used to capture multiview imagery of the local environment of the electronic device, and from this information the electronic device may identify spatial features representing objects in the local environment and their distances from the electronic device. Further, the ToF depth sensor may be used to determine the distances of the identified spatial features as either an alternative to, or an augmentation to, the depth calculation provided from analysis of the multiview imagery. The electronic device may further include another imaging camera on an opposing surface, for example facing a user, so as to facilitate head tracking or facial recognition or to obtain additional imagery of the local environment.

The identification of the relative position/orientation of objects in the local environment can be used to support various location-based functionality of an electronic device. The term "position/orientation" is used herein to refer to either or both of position and orientation. To illustrate, in some embodiments, the relative positions of objects in the local environment are used, along with non-image sensor data such as orientation readings from a gyroscope, to determine the relative position/orientation of the electronic device in the local environment. The relative position/orientation of the electronic device may be used to facilitate visual odometry, navigation, safety functionality or other SLAM functionality. Moreover, the relative position/orientation of the electronic device may be used to support augmented reality (AR) functionality, such as the graphical overlay of additional information in the display of imagery captured by the electronic device based on the relative position and/or orientation of the electronic device, and which also may be based on the position or the orientation of the user's head or eyes relative to the electronic device. In some embodiments, the electronic device determines its position/orientation relative to the local environment, rather than relative to a fixed or defined positioning reference, and thus is not reliant on external positioning information, such as global positioning system (GPS) information, cellular triangulation information, and the like. As such, the electronic device can provide location-based functionality in locations where GPS signaling or cellular signaling is weak or non-existent.

The depth sensor of the electronic device is implemented as, for example, a modulated light projector and one or more of the imaging cameras. The modulated light projector projects coded, structured, or otherwise modulated light, typically infrared light, into the local environment, and the one or more imaging cameras capture the reflections of the modulated light from the objects, and from this reflected light the distance of the objects from the electronic device may be determined.

FIG. 1. illustrates an electronic device 100 configured to support location-based functionality, such as SLAM or AR, using image and non-image sensor data in accordance with at least one embodiment of the present disclosure. The electronic device 100 can include a portable user device, such as a tablet computer, computing-enabled cellular phone (e.g., a "smartphone"), a notebook computer, a personal digital assistant (PDA), a gaming system remote, a television remote, and the like. In other embodiments, the electronic device 100 can include a fixture device, such as medical imaging equipment, a safety imaging camera system, an industrial robot control system, a drone control system, and the like. For ease of illustration, the electronic device 100 is generally described herein in the example context of a portable user device, such as a tablet computer or a smartphone; however, the electronic device 100 is not limited to these example implementations.

In the depicted example, the electronic device 100 includes a housing 102 having a surface 104 opposite another surface 106. In the example thin rectangular block form-factor depicted, the surfaces 104 and 106 are substantially parallel and the housing 102 further includes four side surfaces (top, bottom, left, and right) between the surface 104 and surface 106. The housing 102 may be implemented in many other form factors, and the surfaces 104 and 106 may have a non-parallel orientation. For the illustrated tablet implementation, the electronic device 100 includes a display 108 disposed at the surface 104 for presenting visual information to a user 110. Accordingly, for ease of reference, the surface 106 is referred to herein as the "forward-facing" surface and the surface 104 is referred to herein as the "user-facing" surface as a reflection of this example orientation of the electronic device 100 relative to the user 110, although the orientation of these surfaces is not limited by these relational designations.

The electronic device 100 includes a plurality of sensors to obtain information regarding a local environment 112 of the electronic device 100. The electronic device 100 obtains visual information (imagery) for the local environment 112 via imaging cameras 114 and 116 and a depth sensor 120 disposed at the forward-facing surface 106 and an imaging camera 118 disposed at the user-facing surface 104. In one embodiment, the imaging camera 114 is implemented as a wide-angle imaging camera having a fish-eye lens or other wide-angle lens to provide a wider angle view of the local environment 112 facing the surface 106. The imaging camera 116 is implemented as a narrow-angle imaging camera having a typical angle of view lens to provide a narrower angle view of the local environment 112 facing the surface 106. Accordingly, the imaging camera 114 and the imaging camera 116 are also referred to herein as the "wide-angle imaging camera 114" and the "narrow-angle imaging camera 116," respectively. As described in greater detail below, the wide-angle imaging camera 114 and the narrow-angle imaging camera 116 can be positioned and oriented on the forward-facing surface 106 such that their fields of view overlap starting at a specified distance from the electronic device 100, thereby enabling depth sensing of objects in the local environment 112 that are positioned in the region of overlapping fields of view via multiview image analysis. The imaging camera 118 can be used to capture image data for the local environment 112 facing the surface 104. Further, in some embodiments, the imaging camera 118 is configured for tracking the movements of the head 122 or for facial recognition, and thus providing head tracking information that may be used to adjust a view perspective of imagery presented via the display 108.

One or more of the imaging cameras 114, 116, and 118 may serve other imaging functions for the electronic device 100 in addition to supporting position and orientation detection. To illustrate, the narrow-angle imaging camera 116 may be configured or optimized for user-initiated image capture, such as for the capture of consumer-level photographs and video as often found in smartphones and tablet computers, and the imaging camera 118 may be configured or optimized for video conferencing or video telephony as also is often found in smartphones and tablet computers, whereas the wide-angle imaging camera 114 may be primarily configured for machine vision image capture for purposes of location detection. This machine-vision-specific configuration may prioritize light-sensitivity, lens distortion, frame rate, global shutter capabilities, and faster data readout from the image sensor over user-centric camera configurations that focus on, for example, pixel resolution.

The depth sensor 120, in one embodiment, uses a modulated light projector 119 to project modulated light patterns from the forward-facing surface 106 into the local environment, and uses one or both of imaging cameras 114 and 116 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth imagery." Objects closer to the depth sensor appear much brighter than objects farther away from the depth sensor since the illumination received by an object falls off with the square of its distance from the light source.

The depth sensor 120 may calculate the depths of the objects, that is, the distances of the objects from the electronic device 100, based on the analysis of the depth imagery. However, stray light artifacts are generated by use of the depth sensor. Any one point in the physical scene casts light onto a group of pixels of the ToF camera and not onto only a single pixel of the ToF camera. As a result, the group of pixels which is illuminated by a point-like source (described by the point spread function (PSF)) can have their resulting depth data obtained by the depth sensor polluted by the point like source For example, the PSF of a bright object (i.e., object closer to the ToF camera) can extend into the image region of a darker object (i.e., object farther from the ToF camera). The signals detected for a darker object thus are superimposed by an attenuated copy of a bright object's signal such that reconstructed depth data may show significant distortions from reality. The polluted signal of the darker object makes it appear that the darker object is closer to, and in certain instances farther from, the ToF camera than it is in reality which can have a detrimental effect on uses of the electronic device involving the depth data. Generally, the polluted signal creates a deviation of the estimated depth of an object from the actual depth of the object.

For instance, the resulting depth data obtained from the depth sensor 120 may be used to calibrate or otherwise augment depth information obtained from multiview analysis (e.g., stereoscopic analysis) of the image data captured by the imaging cameras 114 and 116. Alternatively, the depth data from the depth sensor 120 may be used in place of depth information obtained from multiview analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic device 100 senses that it is outdoors or otherwise in relatively good lighting conditions, the electronic device 100 may elect to use multiview analysis to determine object depths. Conversely, when the electronic device 100 senses that it is indoors or otherwise in relatively poor lighting conditions, the electronic device 100 may switch to using modulated light-based depth sensing via the depth sensor 120.

The electronic device 100 also may rely on non-image information for position/orientation detection. This non-image information can be obtained by the electronic device 100 via one or more non-image sensors (not shown in FIG. 1), such as a gyroscope or ambient light sensor. The non-image sensors also can include user interface components, such as a keypad (e.g., touchscreen or keyboard), microphone, mouse, and the like. The non-image sensor information representing a state of the electronic device 100 at a given point in time is referred to as the "current context" of the electronic device for that point in time. This current context can include explicit context, such as the relative rotational orientation of the electronic device 100 or the ambient light from the local environment 112 incident on the electronic device 100. The current context also can include implicit context information, such as information inferred from calendar information or clock information, or information inferred from a user's interactions with the electronic device 100. The user's interactions can include a user's observed past behavior (e.g., a determination of a user's workday commute path and time), recent search queries conducted by the user, a key term search or other analysis of emails, text messages, or other user communications or user-initiated operations, and the like.

In operation, the electronic device 100 uses the image sensor data and the non-image sensor data to determine a relative position/orientation of the electronic device 100, that is, a position/orientation relative to the local environment 112. In at least one embodiment, the determination of the relative position/orientation is based on the detection of spatial features in image data captured by one or more of the imaging cameras 114, 116, and 118 and the determination of the position/orientation of the electronic device 100 relative to the detected spatial features. To illustrate, in the depicted example of FIG. 1, the local environment 112 includes a hallway of an office building that includes three corners 124, 126, and 128, a baseboard 130, and an electrical outlet 132. The user 110 has positioned and oriented the electronic device 100 so that the forward-facing imaging cameras 114 and 116 capture wide angle imaging camera image data 134 and narrow angle imaging camera image data 136, respectively, that includes these spatial features of the hallway. In this example, the depth sensor 120 also captures depth data 138 that reflects the relative distances of these spatial features relative to the current position/orientation of the electronic device 100. Further, the user-facing imaging camera 118 captures image data representing head tracking data 140 for the current position/orientation of the head 122 of the user 110. Non-image sensor data 142, such as readings from a gyroscope, a magnetometer, an ambient light sensor, a keypad, a microphone, and the like, also is collected by the electronic device 100 in its current position/orientation.

From this input data, the electronic device 100 can determine its relative position/orientation without explicit absolute localization information from an external source. To illustrate, the electronic device 100 can perform multi-view analysis of the wide angle imaging camera image data 134 and the narrow angle imaging camera image data 136 to determine the distances between the electronic device 100 and the corners 124, 126, 128. Alternatively, the depth data 138 obtained from the depth sensor 120 can be used to determine the distances of the spatial features. From these distances the electronic device 100 can triangulate or otherwise infer its relative position in the office represented by the local environment 112. As another example, the electronic device 100 can identify spatial features present in one set of captured image frames of the image data 134 and 136, determine the initial distances to these spatial features, and then track the changes in position and distances of these spatial features in subsequent captured imagery to determine the change in position/orientation of the electronic device 100. In this approach, certain non-image sensor data, such as gyroscopic data or accelerometer data, can be used to correlate spatial features observed in one image frame with spatial features observed in a subsequent image frame.

The relative position/orientation information obtained by the electronic device 100 from the image data captured by the imaging cameras 114, 116, and 118 can be used to support any of a variety of location-based functionality. The relative position/orientation information can be used by the electronic device 100 to support navigation safety functionality or other SLAM functionality. As an example, the electronic device 100 can map the local environment 112 and then use this mapping to facilitate the user's navigation through the local environment 112, such as by displaying to the user a floor plan generated from the mapping information and an indicator of the user's current location relative to the floor plan as determined from the current relative position of the electronic device 100. As another example, the electronic device 100 can be embedded in a vehicle (e.g., the user facing surface being positioned in the vehicle and the forward facing surface positioned at the rear of the vehicle) and used to map the local environment 112 and then use this mapping to facilitate the user's safe navigation through the local environment 112.

Moreover, the relative position/orientation information obtained by the electronic device 100 can be combined with supplemental information 144 to present an augmented reality (AR) view of the local environment 112 to the user 110 via the display 108 of the electronic device 100. This supplemental information 144 can include one or more AR databases locally stored at the electronic device 100 or remotely accessible by the electronic device 100 via a wired or wireless network.

To illustrate, in the depicted example of FIG. 1, a local database stores position/orientation computer-aided drawing (CAD) information for electrical wiring embedded within the walls of the office represented by the local environment 112. Accordingly, the electronic device 100 can capture video imagery of a view of the local environment 112 via the imaging camera 116, determine a relative orientation/position of the electronic device 100 as described above and herein, and determine the position and orientation of electrical wiring located within the walls present in the view of the local environment. The electronic device 100 then can generate a graphical overlay with visual representations of the electrical wiring positioned and oriented relative to corresponding spatial features (e.g., the corners 124, 126, and 128) identified in the video imagery. As illustrated in FIG. 1, the graphical overlay can include colored dashed lines 152 and 154 representing electrical wiring in the current view and description balloons 156 and 158 to provide descriptions of the electrical wiring, such as wiring type, an identifier associated with the wiring, and the building components powered by the corresponding wiring. The electronic device 100 then jointly presents the graphical overlay and the video imagery at the display 108 so as to present the user 110 with a graphical representation 160 of the location of electrical wiring within the current view of the local environment 112 as captured by the narrow angle imaging camera 116. As the electronic device 100 moves relative to the previous view, the electronic device 100 updates the graphical overlay so as to reflect the changed perspective. Moreover, the head tracking data 140 can be used to detect changes in the position of the head 122 of the user 110 relative to the display 108, in response to which the electronic device 100 can adjust the displayed graphical representation 160 so as to reflect the changed viewing angle of the user 110 relative to the display 108.

As another example, a local or remote AR database can be used to facilitate indoor navigation via the electronic device 100. To illustrate, the local environment 112 could represent the interior of a shopping mall and, in response to receiving user input indicating a desire to locate a certain store, the electronic device 100 can access the AR database to determine the location of the store relative to its current location. With this information, the electronic device 100 can display on top of the video imagery currently captured by one or more of the imaging cameras 114, 116, or 118 a graphical overlay that identifies the direction of the store relative to the current direction in which the electronic device 100 is pointed (e.g., via the display of "turn right", "turn left", "proceed straight ahead", or "turn around" arrow graphics).

Another example application of the relative position/orientation determination process can include, for example, missing/new object detection whereby the appearance of a new object or the disappearance of a previously identified object can be determined based on a comparison of the expected local environment view of the electronic device 100 for a given relative position and orientation to the actual local environment view captured by the electronic device 100 in the same position/orientation. As described below, the geometric uncertainty introduced by differences between an expected environment and the actual encountered environment can trigger various operations, including a refresh operation whereby the electronic device 100 initiates a remapping of the portion of the local environment 112 exhibiting the change.

FIGS. 2 and 3 illustrate example front and back plan views of an example implementation of the electronic device 100 in a tablet form factor in accordance with at least one embodiment of the present disclosure. The electronic device 100 may be implemented in other form factors, such as a smart phone form factor, a medical imaging device form factor, vehicle mounted form factor, and the like, which implement configurations analogous to those illustrated.

As illustrated by the front plan view 200 of FIG. 2, the electronic device 100 can include the display 108, the imaging camera 118, and one or more user interface components, such as touch keys 202, 204, and 206 of a keypad disposed at the user-facing surface 104. Moreover, the display 108 may be implemented as a touch screen display so as to facilitate user input and control via the user's interaction with the display 108.

As illustrated by the back plan view 300 of FIG. 3, the electronic device 100 can include the wide-view imaging camera 114, the narrow-view imaging camera 116, and the modulated light projector 119 disposed at the forward-facing surface 106. Although FIGS. 2 and 3 illustrate the imaging cameras 114, 116, and 118 and the modulated light projector 119 aligned along a straight line for the benefit of an example cross-section view in FIG. 4, the imaging cameras 114, 116, and 118 and the modulated light projector 119 may be offset relative to each other. For example, the modulated light projector 119 may be positioned at an offset from a line extending between the imaging cameras 114 and 116, or the modulated light projector 119 and the wide-angle imaging camera 114 may be disposed along a line parallel to the top edge of the electronic device 100 and the narrow-angle imaging camera 116 may be disposed at a location offset from this line. Moreover, although the modulated light projector 119 is illustrated as positioned between the imaging cameras 114 and 116, in other implementations the modulated light projector 119 may be positioned to the outside of one of the imaging cameras 114 and 116.

Figure 4:
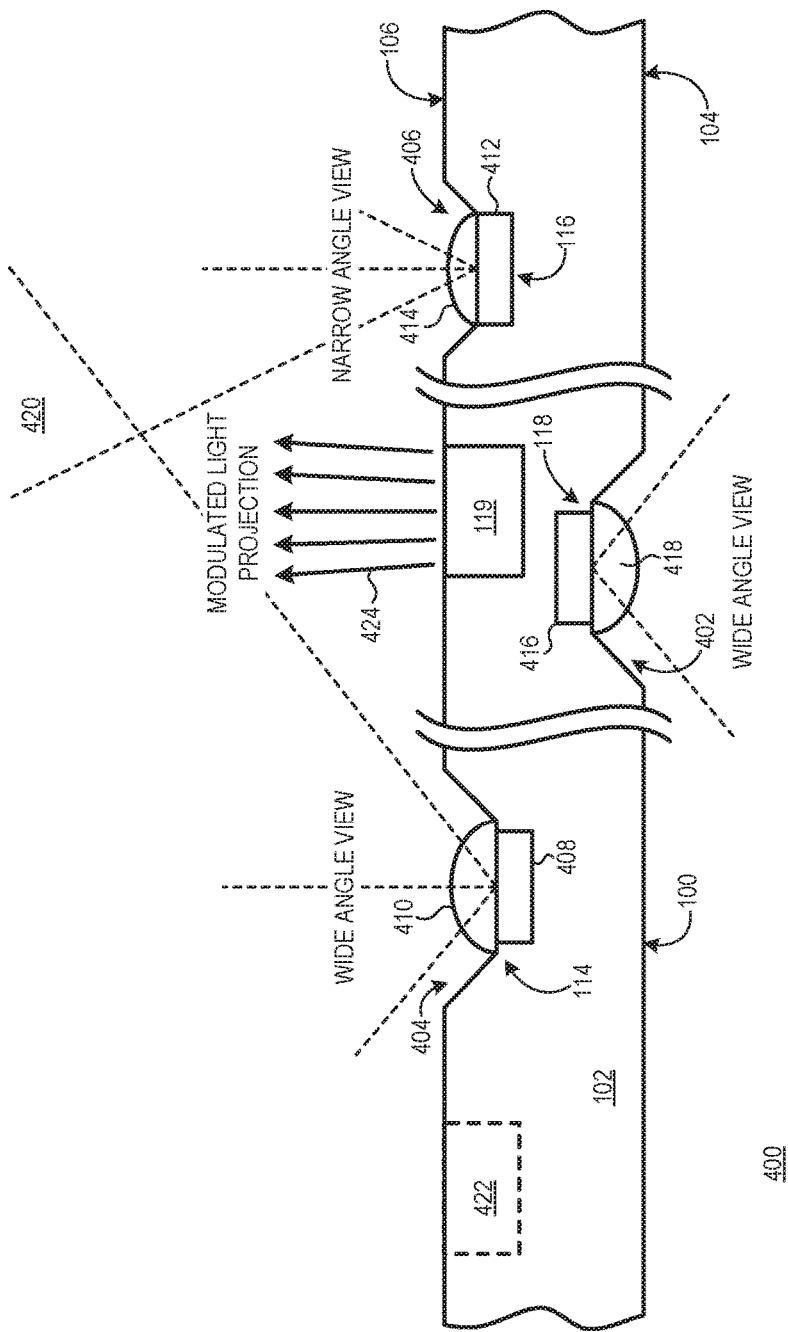
FIG. 4 is a diagram illustrating a cross-section view of the electronic device of FIG. 2 in accordance with at least one embodiment of the present disclosure.

FIG. 4 illustrates an example cross-section view 400 of the electronic device 100 along a line 210 depicted in the plan views of FIGS. 2 and 3 in accordance with at least one embodiment of the present disclosure. As illustrated, the electronic device 100 includes the user-facing imaging camera 118 disposed in an aperture 402 or other opening in the housing 102 at the user-facing surface 104 and includes the wide-angle imaging camera 114 and the narrow-angle imaging camera 116 disposed in apertures 404 and 406, respectively, or other openings in the housing 102 at the forward-facing surface 106. The wide-angle imaging camera 114 includes an image sensor 408 and one or more lenses 410 disposed over a sensing surface of the image sensor 408. The narrow-angle imaging camera 116 includes an image sensor 412 and one or more lenses 414 disposed over the sensing surface of the image sensor 412. Similarly, the user-facing imaging camera 118 includes an image sensor 416 and one or more lenses 418 disposed over the sensing surface of the image sensor 416.

The image sensors 408, 412, and 416 of the imaging cameras 114, 116, and 118, respectively, can be implemented as charge coupled device (CCD)-based sensors, complementary metal-oxide-semiconductor (CMOS) active pixel sensors, and the like. In a CMOS-based implementation, the image sensor may include a rolling shutter sensor whereby a group of one or more rows of pixel sensors of the image sensor is read out while all other rows on the sensor continue to be exposed. This approach has the benefit of providing increased sensitivity due to the longer exposure times or more usable light sensitive area, but with the drawback of being subject to distortion due to high-speed objects being captured in the frame. The effect of distortion can be minimized by implementing a global reset mechanism in the rolling shutter so that all of the pixels on the sensor begin collecting charge simultaneously, rather than on a row-by-row basis. In a CCD-based implementation, the image sensor can be implemented as a global shutter sensor whereby all pixels of the sensor are exposed at the same time and then transferred to a shielded area that can then be read out while the next image frame is being exposed. This approach has the benefit of being less susceptible to distortion, with the downside of generally decreased sensitivity due to the additional electronics required per pixel.

In some embodiments the fields of view of the wide-angle imaging camera 114 and the narrow-angle imaging camera 116 overlap in a region 420 so that objects in the local environment 112 (FIG. 1) in the region 420 are represented both in the image frame captured by the wide-angle imaging camera 114 and in the image frame concurrently captured by the narrow-angle imaging camera 116, thereby allowing the depth of the objects in the region 420 to be determined by the electronic device 100 through a multiview analysis of the two concurrent image frames. As such, the forward-facing imaging cameras 114 and 116 are positioned at the forward-facing surface 106 so that the region 420 covers an intended distance range and sweep relative to the electronic device 100. Moreover, as the multiview analysis relies on the parallax phenomena, the forward-facing imaging cameras 114 and 116 are sufficiently separated to provide adequate parallax for the multiview analysis.

Also illustrated in the cross-section view 400 are various example positions of the modulated light projector 119. The modulated light projector 119 projects an infrared modulated light pattern 424 in a direction generally perpendicular to the surface 106, and one or both of the forward-facing imaging cameras 114 and 116 are utilized to capture reflection of the projected light pattern 424. In the depicted example, the modulated light projector 119 is disposed at the forward-facing surface 106 at a location between the imaging cameras 114 and 116. In other embodiments, the modulated light projector 119 can be disposed at a location between one of the imaging cameras and an edge of the housing 102, such as at a location 422 between the wide-angle imaging camera 114 and the side of the housing 102, or at a location (not shown) between the narrow-angle imaging camera 116 and the side of the housing 102.

Figure 5:
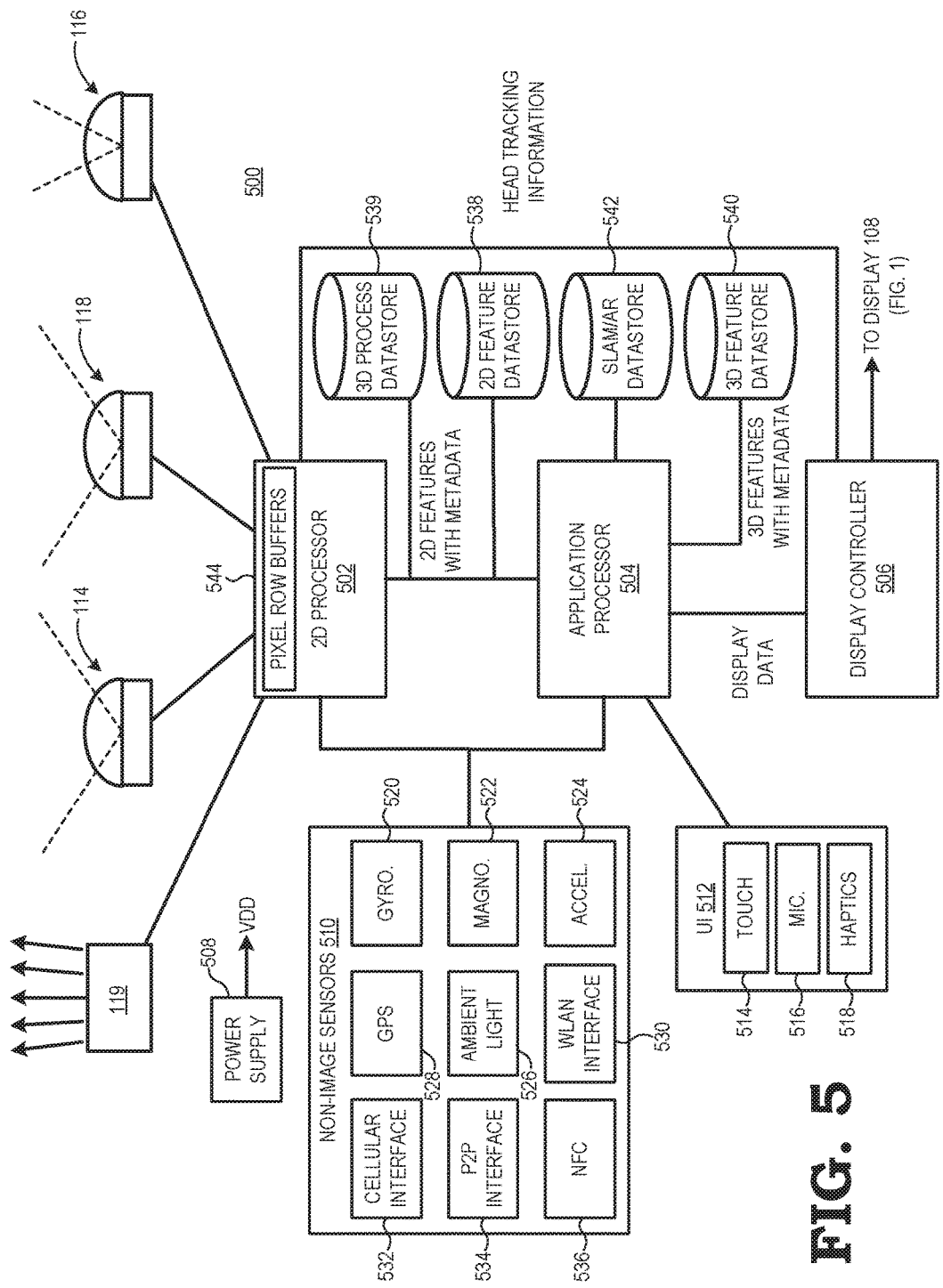
FIG. 5 is a block diagram illustrating a processing system of an electronic device for determining two-dimensional (2D) and three-dimensional (3D) spatial feature data from captured imagery of a local environment in accordance with at least one embodiment of the present disclosure.

FIG. 5 illustrates an example processing system 500 implemented by the electronic device 100 in accordance with at least one embodiment of the present disclosure. The processing system 500 includes the wide-angle imaging camera 114, the narrow-angle imaging camera 116, the user-facing imaging camera 118, and the depth sensor 120. The processing system 500 further includes a 2D processor 502, an application processor 504, a display controller 506, a power supply 508, a set 510 of non-image sensors, and a user interface 512.

In a portable user device implementation, such as a tablet computer or smartphone implementation, the power supply 508 can include a battery, solar array, or other portable power source used to power the electrical components of the electronic device. In a non-portable device implementation, the power supply 508 can include a power converter to convert an external voltage supply to a voltage level appropriate for the components of the electronic device 100. The user interface 512 includes one or more components manipulated by the user to provide user input to the electronic device 100, such as a touchscreen 514, a mouse, a keyboard, a microphone 516, various buttons or switches, and various haptic actuators 518. The set 510 of non-image sensors can include any of a variety of sensors used to provide non-image context or state of the electronic device 100. Examples of such sensors include a gyroscope 520, a magnetometer 522, an accelerometer 524, and an ambient light sensor 526. The non-image sensors further can include various wireless reception or transmission based sensors, such as a GPS receiver 528, a wireless local area network (WLAN) interface 530, a cellular interface 532, a peer-to-peer (P2P) wireless interface 534, and a near field communications (NFC) interface 536. The non-image sensors also can include user input components of the user interface 512, such as the touchscreen 514 or the microphone 516.

The electronic device 100 further has access to various datastores storing information or metadata used in conjunction with its image processing, location mapping, and location-utilization processes. These datastores can include a 2D feature datastore 538 to store metadata for 2D spatial features identified from imagery captured by the imaging cameras of the electronic device 100 and a 3D spatial feature datastore 540 to store metadata for 3D features identified from depth sensing for the 2D spatial features using multi-view analysis or modulated light-based depth sensing. The metadata stored for the 2D and 3D features can include, for example, timestamps for synchronization purposes, image frame identifiers of the image frames in which the spatial features were identified, identifiers of the capture device used, calibration information, and the like. This metadata further can include non-image sensor data that was contemporaneous with the image frame containing the identified spatial feature, such as GPS, wifi, or other radio information, time-of-day information, weather condition information (which affects the lighting), and the like. The datastores also include a 3D processing datastore 539 that stores raw depth images, amplitude frames and confidence arrays relating to depth data for use dynamically parameterizing and applying a filter for invalidating depth data affected by light distortion as further described herein. The datastores further can include a SLAM/AR datastore 542 that stores SLAM-based information, such as mapping information for areas of the local environment 112 (FIG. 1) already explored by the electronic device 100, or AR information, such as CAD-based representations of the relative locations of objects of interest in the local environment 112. The datastores may be local to the electronic device 100, such as on a random access memory, hard drive, solid state memory, or removable storage medium (not shown), the datastores may be remotely located and accessible via, for example, one or more of the wireless interfaces of the electronic device 100, or the datastores may be implemented as a combination of local and remote data storage.

In the depicted implementation, the processing system 500 employs two processors: the 2D processor 502 configured to efficiently identify 2D spatial features from visible-light imagery and depth sensor imagery captured by the imaging cameras of the electronic device 100; and the application processor 504 configured to efficiently identify 3D spatial features from the 2D spatial features and to efficiently provide location-based functionality, such as visual odometry or other SLAM functionality, AR functionality, and the like. However, in other embodiments, the described functionality of the 2D processor 502 and the application processor 504 may be implemented in a single processor, or more than two processors together may implement the described functionality. The 2D processor 502 can be implemented as, for example, a single-core or multiple-core graphics processing unit (GPU) and the application processor 504 can be implemented as, for example, a GPU or a single-core or multiple-core central processing unit (CPU).

The 2D processor 502 is coupled to the wide-angle imaging camera 114, the narrow-angle imaging camera 116, and the user-facing imaging camera 118 so as to receive image data captured by the imaging cameras in one or more pixel row buffers 844. In one embodiment, the 2D processor 502 includes an interface and a pixel row buffer 844 for each imaging camera so as to be able to receive image data from each imaging camera in parallel. In another embodiment, the 2D processor 502 includes a single interface and a pixel row buffer 544 and thus the 2D processor 502 multiplexes between the imaging cameras.

The 2D processor 502 is configured to process the captured image data from the imaging cameras to identify 2D spatial features present in the image data. In some embodiments, the 2D processor 502 implements a hardware configuration specifically designed for this task. In other embodiments, the 2D processor 502 includes a more general processor architecture that provides the 2D spatial feature detection through execution of a software program configured to implement the 2D spatial feature detection process. The 2D processor 502 also may implement a combination of specialized hardware and specialized software for this purpose. As described above, any of a variety of well-known 2D spatial feature detection or extraction algorithms may be implemented by the 2D processor 502. The 2D processor 502 stores metadata and other information pertaining to the identified 2D spatial features to the 2D feature datastore 538.

The 2D processor 502, in one embodiment, is configured to analyze imagery captured by the user-facing imaging camera 118 to track the current position/orientation of the user's head using any of a variety of well-known head tracking algorithms. In the depicted example, the 2D processor 502 provides the head tracking information to the display controller 506, which in turn is configured to adjust the displayed imagery to react to changes in the user's view perspective as reflected in changes in position/orientation of the user's head. In another embodiment, the 2D processor 502 provides the head tracking information to the application processor 504, which in turn modifies the display data to reflect updated view perspectives before the display data is provided to the display controller 506.

The 2D processor 502 also acts as a controller that operates the modulated light projector 119 in its use in determining depth data for spatial features identified in the captured imagery of the local environment 112. In certain conditions, such as relatively bright settings (as sensed using the ambient light sensor 526), the 2D processor 502 may use multiview image analysis of imagery concurrently captured by the wide-angle imaging camera 114 and the narrow-angle imaging camera 116 to determine depth data for spatial features present in the captured imagery. In other conditions, such as relatively low lighting conditions, the 2D processor 502 may switch to the use of the depth sensor 120 (FIG. 1) to determine this depth data. In other embodiments, the processing system 500 implements a controller (not shown) separate from the 2D processor 502 to control the operation of the modulated light projector 119.

As described above, the depth sensor 120 relies on the projection of a modulated light pattern by the modulated light projector 119 into the local environment and on the capture of the reflection of the modulated light pattern therefrom by one or more of the imaging cameras. Thus, the 2D processor 502 may use one or both of the forward-facing imaging cameras 114 and 116 to capture the reflection of a projection of the modulated light pattern and process the resulting imagery of the reflected modulated light pattern to determine the depths of corresponding spatial features represented in the reflected modulated light pattern. To match a depth reading with a corresponding 2D spatial feature, the 2D processor 502 can perform a 2D spatial feature analysis on the depth imagery to determine a 2D spatial feature and its relative depth, and then attempt to match the 2D spatial feature to a corresponding spatial feature identified in the visual-light imagery captured at or near the same time as the reflected modulated light imagery was captured. In another embodiment, the 2D processor 502 can capture a visible-light image, and quickly thereafter control the modulated light projector 119 to project a modulated light pattern and capture a reflected modulated light image. The 2D processor 502 then can develop a depth map for the visible-light image from the reflected modulated light image as they effectively represent the same scene with the same spatial features at the same coordinates due to the contemporaneous capture of the visible-light image and the reflected modulated light image.

The application processor 504 is configured to identify 3D spatial features represented in the captured imagery using the 2D spatial features represented in the 2D feature datastore 538 and using non-image sensor information from the set 510 of non-image sensors. As with the 2D processor 502, the application processor 504 may be configured to perform this process through a specialized hardware configuration, through execution of software configured for this process, or a combination of specialized hardware and software. Metadata and other information for the identified 3D spatial features is stored in the 3D feature datastore 540.

The application processor 504 further is configured to provide SLAM, AR, VR, and other location-based functionality using 3D spatial features represented in the 3D feature datastore 540 and using the current context of the electronic device 100 as represented by non-image sensor data. The current context can include explicit or implicit user input obtained from, for example, the user interface 512 or via an analysis of user interactions. This functionality can include determining the current relative position/orientation of the electronic device 100 based on a visual odometry process that uses the 3D spatial features and various location-related non-image sensor data, such as a 6DoF reading from the gyroscope 520, a dead-reckoning history maintained using the accelerometer 524, a coarse absolute positional indicator determined using the GPS receiver 528 or determined using radio telemetry via the cellular interface 532, and the like. Similarly, the application processor 504 can use a history of positions/orientations of the electronic device 100 and a history of spatial features observed in those positions/orientations to create a map of the local environment 112.

The location-based functionality provided by the application processor 504 further can include AR-related or VR-related functionality that includes identifying and accessing from the SLAM/AR datastore 542 graphical information to be provided as a graphical overlay on the display 108 based on the current position/orientation determined by the application processor 504. This graphical overlay can be provided in association with imagery captured by the imaging cameras in the current position/orientation for display at the display 108 via the display controller 506. The display controller 506 operates to control the display 108 (FIG. 1) to display imagery represented by display data received from the application processor 504. Further, in some embodiments, the display controller 506 can receive head tracking information from the 2D processor 502 and adjust the view perspective of the imagery being displayed based on the user head position or eye position represented in the received head tracking information.

In a conventional 2D spatial feature detection application, an entire image frame is captured and then buffered at a frame buffer before a GPU or other processor initiates spatial feature extraction for the image frame. This approach can introduce a significant delay or lag in the spatial feature detection, and thus introduce a significant delay or lag in position/orientation detection, due to the delay incurred in transferring the image data to the frame buffer in preparation for its access by the GPU. To reduce or eliminate this lag, in some embodiments the 2D processor 502 is configured to perform 2D spatial feature extraction as captured image data is streamed to the 2D processor from a corresponding imaging camera. As the pixel row buffer 544 receives a subset of one or more pixel rows from the imaging camera, the 2D processor 502 processes the image portion represented by the subset of buffered pixels to identify 2D spatial features present in the image portion. The 2D processor 502 then may stream 2D spatial features to the 2D feature datastore 838, or directly to an input of the application processor 504, as they are identified from the image portion. As 2D spatial features are identified as the image data is streamed in, and as the identified 2D spatial features are streamed to the application processor 504 as they are identified, the 2D spatial feature detection process and the 3D spatial feature detection process can proceed at a faster rate compared to conventional image processing techniques that rely on whole image frame analysis.

The identification of the spatial features in an image provides the relative location of those spatial features in a two-dimensional space, that is, "2D spatial features." In order to map a 2D spatial feature to a third dimension (i.e., the distance, or "depth" from the electronic device 100), that is, to determine the corresponding "3D image feature", the electronic device 100 determines the depth of the 2D feature relative to the electronic device 100 using one or both of multiview image analysis or analysis using the depth sensor data.

Figure 6:
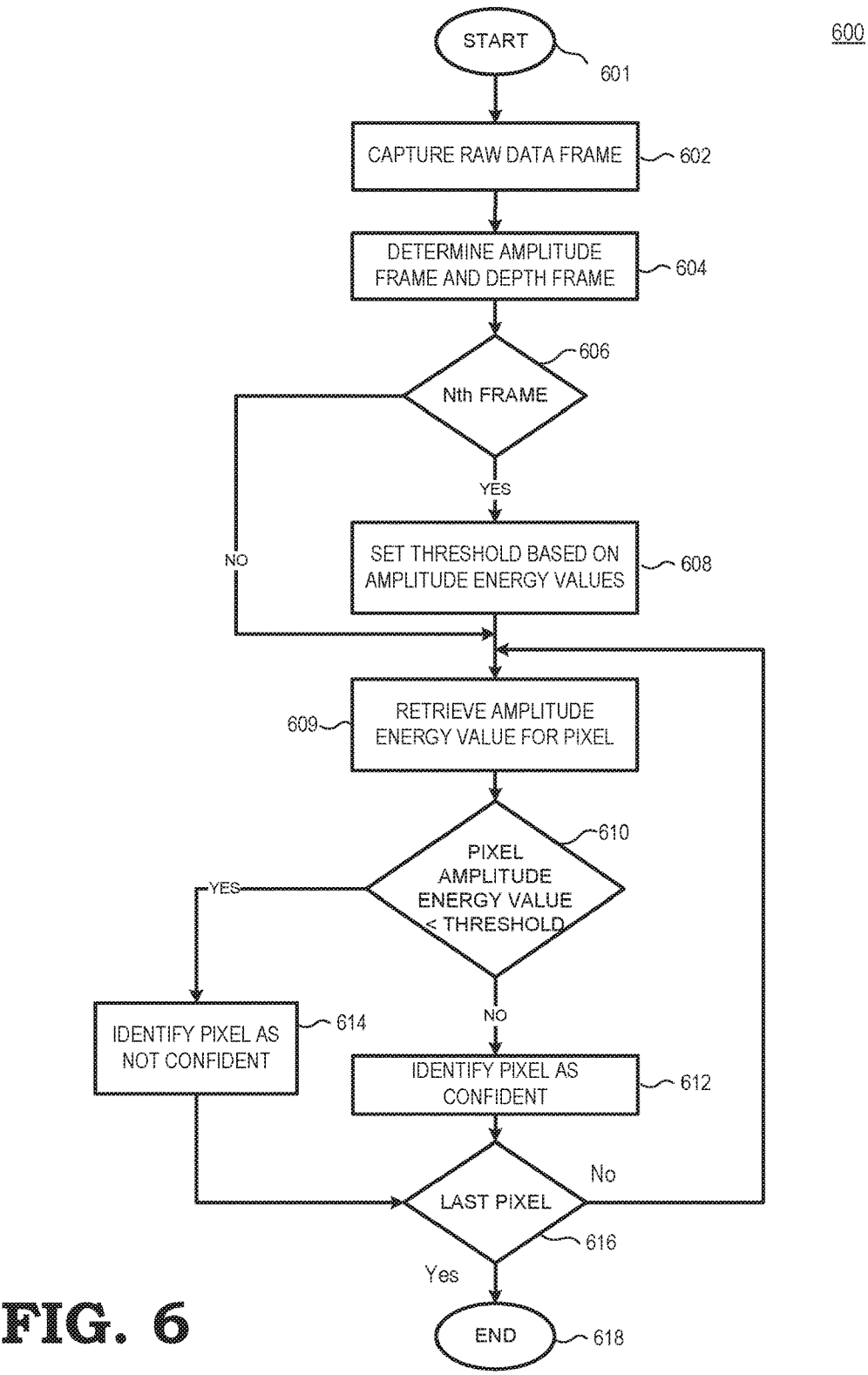
FIG. 6 is a flow diagram illustrating an operation of an electronic device to characterize an amplitude frame of depth data for a 3D image via a dynamically parameterized filter in accordance with at least one embodiment of the present disclosure.

FIG. 6 is a flow diagram illustrating a method 600 of operation of the electronic device 100 to characterize an amplitude frame of depth data for a 3D image via a dynamically parameterized filter in accordance with at least one embodiment of the present disclosure. The electronic device 100 processes resulting imagery of the reflected modulated light pattern to determine the depths of corresponding spatial features represented in the reflected modulated light pattern and the confidence in the accuracy of those depths. The depth of each of one or more spatial features in imagery captured by a visible light camera of the electronic device may be based on the confidence values determined for a plurality of pixels of the amplitude frame.

Systems that use a ToF camera typically acquire multiple raw frames to collect the raw data required to generate a single depth frame. The same raw frames can be used to compute an amplitude frame which encodes the amount of light emitted by the ToF system and returning to the ToF camera. The amplitude frame characterizes the amount of light from the light source returning to the camera and could be called brightness or active brightness in other contexts. Many state-of-the-art systems compute the amplitude images. The amplitude data is typically used to estimate the confidence of the measured values.

The method 600 starts at block 601. As described above the depth sensor 120 relies on the projection of a modulated light pattern by the modulated light projector 119 into the local environment and on the capture of the reflection of the modulated light pattern therefrom by one or more of the ToF imaging cameras. Thus, at block 602, the 2D processor 502 may use one or both of the forward-facing imaging cameras 114 and 116 to capture the reflection of a projection of the modulated light pattern. Accordingly, raw depth images are captured using a time-of-flight camera of an electronic device at block 602. The raw depth image is described further below in connection with FIG. 7.

At block 604, the 2D processor 502 of the electronic device 100 determines an amplitude frame based on one or more raw data frames as is known in the art. The amplitude frame encodes the amount of light emitted by the modulated light projector 119 and returning to the ToF camera (e.g., imaging camera 114, 116). The amplitude frame may be represented as an array of pixels with each pixel of the amplitude frame having an amplitude energy value. The amplitude frame is described further below in connection with FIG. 8. At block 604, the 2D processor 502 of the electronic device 100 also determines a depth frame based on one or more raw data frames as is known in the art. The depth frame may be represented as an array of pixels with each pixel of the depth frame having a depth value. The depth frame is described further below in connection with FIG. 9.

After the amplitude frame and depth frame are determined, the 2D processor 502 determines whether to update a threshold used to characterize the confidence level for the depth data filter at block 606. For example, the threshold may be updated every Nth amplitude frame, where N is a positive integer greater than or equal to one. For example, the threshold may be updated for each amplitude frame or may be updated every second amplitude or may be updated every N amplitude frames.

When the threshold is not to be updated this amplitude frame, the 2D processor 502 skips to block 609. When the threshold is to be updated, at block 608 the 2D processor 502 establishes an energy threshold based on the amplitude energy values of the amplitude frame. In one embodiment, the 2D processor determines the energy threshold value by determining an estimated pixel energy value for the amplitude frame based on the amplitude energy values of the amplitude frame. For example, the amplitude energy value for each pixel of the amplitude frame may be summed and the sum divided by the number of pixels in the amplitude frame to determine the estimated pixel energy value. That is; the estimated pixel energy value is an average amplitude energy for the sum of amplitude energy values of the pixels of the amplitude frame. The first energy threshold value may then be set based on the estimated pixel energy value for the amplitude frame. For instance, the energy threshold value may be a percentage of the estimated pixel energy value. The first energy threshold value may be less than the estimated pixel energy value.

For another example, the 2D processor 502 of electronic device 100 determines the estimated pixel energy from a cumulative distribution function based on the amplitude energy values for the amplitude frame. In that instance, the estimated pixel energy value can be chosen to have a value such that a first percentage of pixels of the amplitude frame have an amplitude energy value equal or less than the value. Again, the first energy threshold may then be set based on the estimated pixel energy for the amplitude frame.

At block 609, the amplitude energy value for a first pixel of the amplitude frame is retrieved. At block 610, for a first pixel of the amplitude frame, the 2D processor 502 determines a confidence value representing a corresponding validity of a depth represented by the first pixel of the depth frame based on a comparison of the amplitude energy value of a corresponding first pixel of the amplitude frame to the energy threshold value. The amplitude energy value of the first pixel from the amplitude frame is compared to the energy threshold value established in block 608. If the amplitude energy value of the first pixel of the amplitude frame is not less than the threshold value, the corresponding pixel in the confidence array is identified with a value indicating confidence in the depth measurement represented by the depth value of the corresponding first pixel of the depth frame (block 612). The 2D processor 502 then continues the methodology with block 616.

If the amplitude energy value of the first pixel of the amplitude frame is less than the threshold value, the corresponding pixel in the confidence array is identified with a value indicating a lack of confidence in the depth measurement represented by the depth value of the corresponding first pixel of the depth frame (block 614) and then the methodology continues to block 616. For instance, a pixel may be identified as invalid when the amplitude energy value of the first pixel of the amplitude frame is less than the first energy threshold. At a later time, the characterization of a pixel (e.g., as valid or invalid; confidence in the depth measurement/lack of confidence in the depth measurement of the depth frame, confidence in the light measurement/lack of confidence in the light measurement of the amplitude frame) can be used for further processing of pixel data.

In another embodiment, amplitude energy values for pixels in the amplitude frame and depth values for pixels in the depth frame can be characterized in the corresponding confidence array according to multiple energy threshold values. Any number of energy thresholds may be established based on the amplitude energy values of the amplitude frame for use in characterizing pixels in the depth frame as described above. For example, if there are two energy thresholds, amplitude frame pixels having an amplitude energy value below the first threshold can be characterized with a first value in the confidence array, amplitude frame pixels having an amplitude energy value above the above the first threshold but below a second threshold can be characterized with a second value and amplitude frame pixels having an amplitude energy value above the second threshold can be characterized with a third value in the confidence array. The first value can indicate low confidence, the second value can indicate medium confidence and the third value can indicate high confidence in the corresponding depth data in the depth frame.

At block 616, the 2D processor 502 determines whether the pixel just characterized as confident/not confident is the last pixel of the amplitude frame. If the pixel most recently operated upon is not the last pixel of an amplitude frame, the 2D processor 502 continues processing at block 609 to retrieve the amplitude energy value for the next pixel of the amplitude frame and then to block 610 to determine the confidence value for that next pixel. If the pixel just operated upon is the last pixel of an amplitude frame, the 2D processor 502 ends the method at block 618. In this manner, the processing methodology is looped through each pixel of an amplitude frame, determining a confidence value for each pixel of the amplitude frame according to a dynamically parameterized filter.

FIG. 7 is a diagram illustrating a representation of an array of raw data pixels in accordance with at least one embodiment of the present disclosure. In the event that the depth sensor 120 is activated, depth data for the local environment can be captured via the depth sensor 120. The depth sensor captures a raw depth image represented as a pixel array 700 composed of a number of pixels 702. The pixel array of the raw depth image is comprised of a number of pixel rows 704 (first row indicated) and pixel columns 706 (second column indicated) by which individual pixels 702 (indicated pixel at third row, fourth column) may be addressed. A pixel array of four pixel rows by four pixel columns is shown FIG. 7 merely for illustrative purposes, a pixel array in actual implementation being composed of some number of multiple rows and columns. In one embodiment, the capture of the depth data is triggered by, or otherwise synchronized to, the capture of concurrent image frames by one or more of the imaging cameras 114, 116, and 118 (FIG. 1) of the electronic device 100. In other embodiments, various sensor data may be periodically or otherwise repeatedly obtained and then synchronized to captured image data using timestamps or other synchronization metadata. It should be noted that different sensors may be read at different rates or frequencies. Also, ToF systems typically acquire multiple raw frames to collect the raw data required to generate a single depth frame.

Each pixel 702 has a data value representing the raw depth data for that pixel of the raw depth image 700. For example, the pixel located at the first pixel row 704 and second pixel column 706 has a value of R2. For example, the pixel at the first pixel row and first pixel column has a value of R1. For example, the pixel 702 at the third pixel row and fourth pixel column has a value of R5.

FIG. 8 is a diagram illustrating a representation of an amplitude frame in accordance with at least one embodiment of the present disclosure. The amplitude frame of FIG. 7 encodes the amount of light emitted by the ToF system and returning to the ToF camera utilizing one or more raw depth images. The amplitude frame 800 comprises an array of pixels 802 having amplitude energy values. The amplitude pixel array is comprised of a number of pixel rows 804 (first row indicated) and pixel columns 806 (second column indicated) by which individual pixels 802 (pixel indicated at third row, fourth column) may be addressed. An amplitude pixel array of four pixel rows by four pixel columns is shown FIG. 8 merely for illustrative purposes, an amplitude pixel array in actual implementation being composed of some number of rows and columns. Each pixel 802 has a value representing the amplitude energy for that pixel of the amplitude frame 800. For example, the amplitude energy of the pixel at the first pixel row 804 and second pixel column 806 has a value of A2. For example, the amplitude energy of the pixel located at the first pixel row and first pixel column has a value of A1. For example, the amplitude of the pixel at the third pixel row and fourth pixel column has a value of A5. Many state-of-the-art systems compute the amplitude images.

FIG. 9 is a diagram illustrating a representation of a depth array in accordance with at least one embodiment of the present disclosure. The depth array 900 comprises an array of pixels or cells 902 having depth values. The depth array is comprised of a number of cell rows 904 (first row indicated) and cell columns 906 (second column indicated) by which individual cells 902 (cell indicated at the third row, fourth column) may be addressed. A depth array of four cell rows by four cell columns is shown FIG. 9 merely for illustrative purposes, a depth array in actual implementation being composed of some number of rows and columns. Each pixel 902 has a value representing the depth for that pixel of the depth frame 800. For example, the depth value of the pixel at the first pixel row 904 and second pixel column 906 has a value of D2. For example, the amplitude energy of the pixel located at the first pixel row and first pixel column has a value of D1. For example, the amplitude of the pixel at the third pixel row and fourth pixel column has a value of D5. Many state-of-the-art systems compute the depth images.

FIG. 10 is a diagram illustrating a representation of a confidence value array in accordance with at least one embodiment of the present disclosure. After determining a first threshold value based on the amplitude energy values of the amplitude frame, a comparison of the amplitude energy value of the respective pixels of the amplitude frame to the first threshold is performed. Based on those comparisons, a confidence value representing a confidence in the depth represented by the corresponding pixel of the depth frame can be determined for each pixel of the depth frame. The confidence array 1000 comprises an array of pixels or cells 1002 having confidence values. The confidence array is comprised of a number of cell rows 1004 (first row indicated) and cell columns 1006 (second column indicated) by which individual cells 1002 (cell indicated at the third row, fourth column) may be addressed. A confidence array of four cell rows by four cell columns is shown FIG. 10 merely for illustrative purposes, a confidence array in actual implementation being composed of some number of rows and columns. Each pixel/cell 1002 of the confidence array has a data value representing the confidence level for the corresponding pixel of the depth frame 900 and the corresponding pixel of the amplitude frame 800.

Assume with respect to FIG. 10 that A1-A5 range in value from the least to highest amplitude energy value. Also assume that the estimated pixel energy calculated with respect to FIG. 8 is determined to be between the values of A2 and A3 and the threshold also established between the values of A2 and A3. This threshold value is used to set up the dynamically parameterized filter by which the confidence value for each pixel is determined. For example, the confidence cell at the first cell row 1004 and second cell column 1006 has a value of C1, a first confidence level. Because the value of A1 in the amplitude frame is less than the threshold value, the corresponding pixel at the first cell row and second cell column of the confidence array is assigned a confidence level with a value of C1, a first confidence level. The value C1 denotes that the electronic device is not confident in the depth represented by the depth value of the corresponding pixel of the depth frame or in the amplitude energy value of the corresponding pixel of the amplitude frame. For example, the confidence level at the third cell row and fourth cell column has a value of C2, a second confidence level. The value C2 denotes that the electronic device is confident in the depth represented by the depth value of the corresponding pixel of the depth frame and in the amplitude energy value of the corresponding pixel of the amplitude frame. This confidence value is assigned because the amplitude energy of pixel at the third row and fourth column of the amplitude frame has a value A5 which is above the threshold energy value. Regions of an image are characterized in the confidence array to identify potentially distortion.

Figure 11:
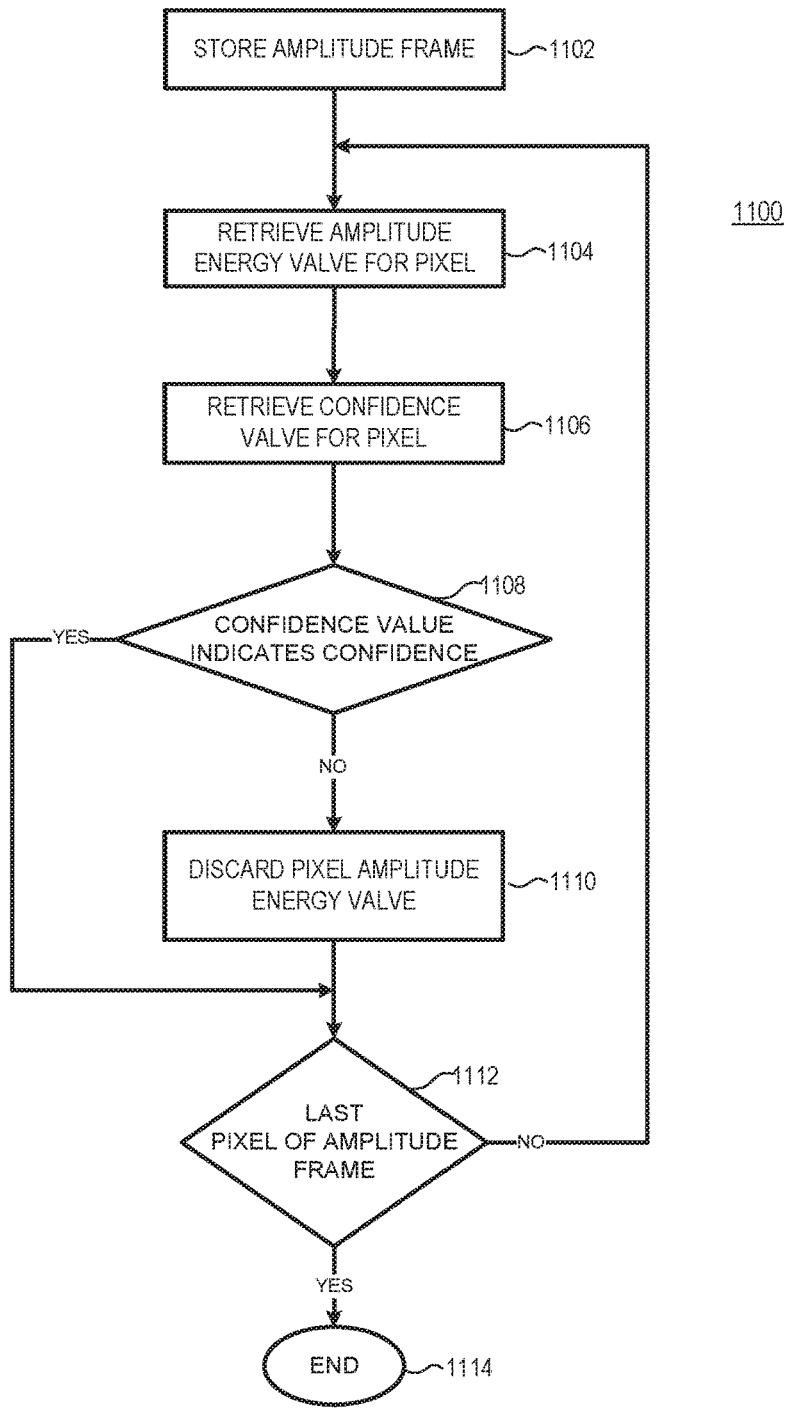
FIG. 11 is a flow diagram illustrating an operation of an electronic device to utilize pixels of an amplitude frame of depth data based a corresponding confidence value array.

FIG. 11 is a flow diagram illustrating a method 1100 of operation of the electronic device 100 to utilize pixels of an amplitude frame based a corresponding confidence value array. At block 1102, the electronic device 100 stores an amplitude frame generated in accordance with the process described above. At block 1104, an amplitude energy value for a pixel of the amplitude frame is retrieved. At block 1106 the confidence value for the corresponding pixel in the confidence value array of retrieved. At block 1108 the confidence value is examined. If the confidence value indicates a suitable confidence in the data represented by the amplitude energy value of the pixel of the amplitude frame, the amplitude energy value for that pixel is identified as valid for use in further operation. For example, if identified as a valid pixel, the pixel data may be passed to a processor for further operation and rendering of the data. If the confidence value indicates a lack of confidence in the data represented by the amplitude energy value of the pixel of the amplitude frame, the amplitude energy value for that pixel is discarded or otherwise invalidated (block 1110) for from processing. At block 1112, a check is performed to determine whether the pixel data examined is the last pixel data for the amplitude frame. If the pixel data examined is the last pixel data for the amplitude frame, the method ends (block 1114). If the pixel data is not the last pixel data for the amplitude frame, the method loops to block 1104.

Figure 12:
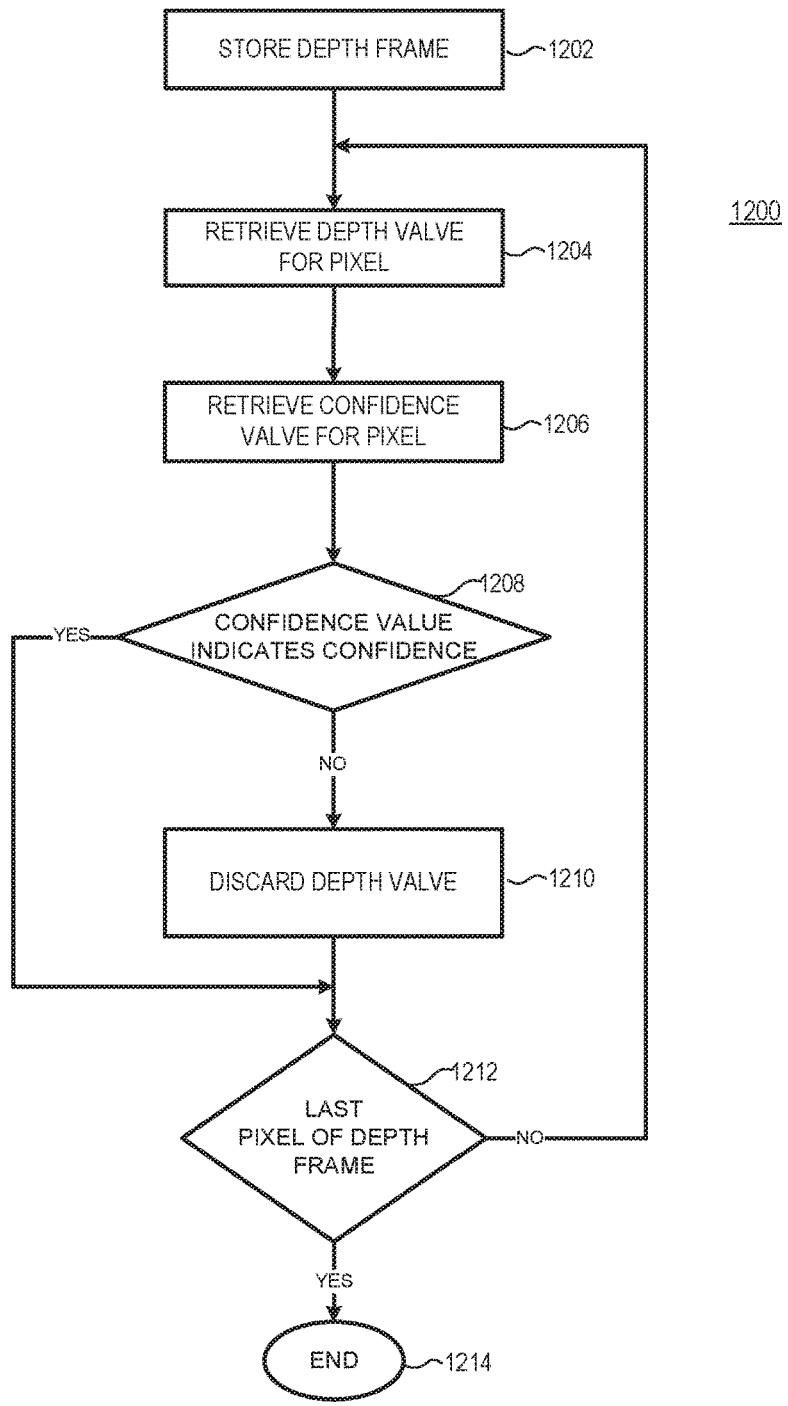
FIG. 12 is a flow diagram illustrating a method 1200 of operation of the electronic device 100 to utilize pixels of a depth data frame based a corresponding confidence value array.

FIG. 12 is a flow diagram illustrating a method 1200 of operation of the electronic device 100 to utilize pixels of depth data based a corresponding confidence value array. At block 1202, the electronic device 100 stores a depth frame generated in accordance with the process described above. At block 1204, a depth value for a pixel of the depth frame is retrieved. At block 1206 the confidence value for the corresponding pixel in the confidence value array of retrieved. At block 1208 the confidence value is examined. If the confidence value, as determined from the amplitude energy value of the corresponding pixel of the amplitude frame, indicates a suitable confidence in the depth data the depth value for that pixel is identified as valid for use in further operation. For example, if identified as a valid pixel, the pixel depth value may be passed to a processor for further operation and rendering of the depth data. If the confidence value indicates a lack of confidence in the depth data as determined from the amplitude energy value of the corresponding pixel of the amplitude frame, the depth value for that pixel of the depth frame is discarded or otherwise invalidated (block 1210) from further processing. The depth frame data that is characterized with a specific confidence level can be identified as invalid in order to invalidate those relatively dark regions of an image which are potentially distorted by superimposed signals from relatively bright image regions. The invalidation of dark regions avoids accumulating incorrect data, ensuring a greater percentage of valid data (i.e., more valid data) is available for other applications such as augmented reality (AR) functionality, automotive safety functionality, machine vision functionality or other simultaneous localization and mapping (SLAM) functionality, and the like. At block 1212, a check is performed to determine whether the pixel data examined is the last pixel data for the depth frame. If the pixel data examined is the last pixel data for the depth frame, the method ends (block 1214). If the pixel data is not the last pixel data for the depth frame, the method loops to block 1204.

In accordance with one aspect, a method includes capturing one or more raw depth images using a time-of-flight camera of an electronic device. The method also includes determining, by one or more processors of the electronic device, a depth frame from the one or more raw depth images, the depth frame comprising an array of pixels, each pixel of the depth frame having a depth value. The method further includes determining, by the one or more processors of the electronic device, an amplitude frame from the one or more raw depth images, the amplitude frame comprising an array of pixels, each pixel of the amplitude frame having an amplitude energy value. The method further comprises determining, by the one or more processors of the electronic device, a first energy threshold value based on the amplitude energy values of the array of pixels of the amplitude frame and determining, by the one or more processors of the electronic device, for the amplitude energy value of a first pixel of the amplitude frame, a confidence value representing a corresponding validity of a depth represented by the depth value of a corresponding first pixel of the depth frame, based on a comparison of the amplitude energy value of the first pixel of the amplitude frame to the first energy threshold value.

In another aspect, the method further includes determining a depth of each of one or more spatial features in imagery captured by a visible light camera of the electronic device based on the confidence values determined for a plurality of pixels of the amplitude frame.

In another aspect, the method includes determining an estimated pixel energy value for the amplitude frame based on the amplitude energy values of the amplitude frame and setting the first energy threshold value based on the estimated pixel energy value for the amplitude frame.

In another aspect, the method includes determining a sum of the amplitude energy values for the pixels of the amplitude frame and determining the estimated pixel energy to be an average amplitude energy value for the sum.

In another aspect, the method includes generating a cumulative distribution function based on the amplitude energy values for the pixels of the amplitude frame and determining the estimated pixel energy to be a value such that a specified percentage of pixels of the amplitude frame have an amplitude energy value equal or less than the value.

In another aspect, the first energy threshold value may be a specified percentage of the estimated pixel energy value. The first energy threshold value may be less than the estimated pixel energy value.

In one aspect, determining the confidence value includes identifying the amplitude energy value of the first pixel of the amplitude frame as invalid when the amplitude energy value of the first pixel of the amplitude frame is less than the first energy threshold value.

In one aspect, when the amplitude energy value of the first pixel of the amplitude frame is identified as invalid, the one or more processors abstain from using the depth value of the corresponding first pixel of the depth frame in determining the depth of features.

In one aspect, determining the confidence value includes identifying the first pixel of the amplitude frame as valid when the amplitude energy value of the first pixel is greater than or equal to the first energy threshold value.

In one aspect, determining the confidence value includes identifying the corresponding first pixel of the depth frame as invalid for use in depth sensing when the amplitude energy value of the first pixel of the amplitude frame is below the first energy threshold value.

In one aspect, the method includes setting a second energy threshold value based on the amplitude energy values of the amplitude frame and characterizing the corresponding first pixel of the depth frame based on the amplitude energy value of the first pixel of the amplitude frame compared to the second energy threshold value.

In yet another aspect, an electronic device includes a time of flight (ToF) camera to capture one or more raw depth images and a processor. The processor is configured to determine a depth frame from the one or more raw depth images, the depth frame comprising an array of pixels, each pixel of the depth frame having a depth value; determine an amplitude frame from the one or more raw depth images, the amplitude frame comprising an array of pixels, each pixel of the amplitude frame having an amplitude energy value, determine a first energy threshold value based on the amplitude energy values of the pixels of the amplitude frame, and determine, for a first pixel of the amplitude frame, a confidence value representing a corresponding validity of a depth represented by the depth value of a corresponding first pixel of the depth frame, based on a comparison of the amplitude energy value of the first pixel of the amplitude frame to the first energy threshold value.

In another aspect, the processor is configured to determine a depth of each of one or more spatial features in imagery captured by a visible light camera of the electronic device based on the confidence values determined for a plurality of pixels of the amplitude frame.

In another aspect, the processor is further configured to determine an estimated pixel energy value for the amplitude frame based on the amplitude energy values of the amplitude frame and set the first energy threshold value based on the estimated pixel energy value for the amplitude frame.

In another aspect, the processor is further configured to determine a sum of the amplitude energy values for the pixels of the amplitude frame, and determine the estimated pixel energy to be an average amplitude energy value for the sum.

In another aspect, the processor is further configured to generate a cumulative distribution function based on the amplitude energy values for the pixels of the amplitude frame and determine the estimated pixel energy to be a value such that a specified percentage of pixels of the amplitude frame have an amplitude energy value equal or less than the value.

In another aspect, the processor is further configured to identify the depth value of the corresponding first pixel of the depth frame as invalid for use in depth sensing when the amplitude energy value of the first pixel of the amplitude frame is below the first energy threshold value.

In another aspect, the processor is configured to abstain from using the first pixel of the amplitude frame for depth sensing when the amplitude energy value of the first pixel is below the first energy threshold value.

In another aspect, electronic device includes a display for displaying a rendering of the amplitude frame and imagery captured by a visible light camera of the electronic device.

In yet another aspect, a method for determining a depth of each of one or more spatial features in imagery captured by a visible light camera of an electronic device using one or more processors of the electronic device includes capturing one or more raw depth images using a depth sensor of the electronic device; and, by one or more processors of the electronic device, determining a depth frame comprising pixels from the one or more raw depth images, the pixels of the depth frame having depth values representing a depth of the pixel; determining an amplitude frame comprising pixels from the one or more raw depth images, the pixels of the amplitude frame having amplitude values representing a brightness of the pixel; determining a threshold based on the amplitude values of the pixels of the amplitude frame, identifying the depth value of a first pixel of the depth frame as valid and using the depth value of the first pixel of the depth frame for determining the depth of the one or more spatial features when the amplitude value of a corresponding first pixel of the amplitude frame is above the threshold, and identifying the depth value of the first pixel of the depth frame as invalid and excluding the depth value of the first pixel of the depth frame from use for determining the depth of the one or more spatial features when the amplitude value of the corresponding first pixel is not above the threshold.

In another aspect, the method includes determining an average pixel value for the amplitude frame and setting the threshold to be a specified percentage of the average pixel value.

In another aspect, the method includes generating a cumulative distribution function based on the amplitude values for the amplitude frame and setting the threshold to be a value such that a specified percentage of pixels of the amplitude frame have amplitude value equal or less than the value.

In yet another aspect, an electronic device for determining a depth of each of one or more spatial features the electronic device includes a visible light camera for capturing imagery including the one or more spatial features; a depth sensor for capturing one or more raw depth images; and one or more processors configured to determine a depth frame comprising pixels from the one or more raw depth images, the pixels of the depth frame having depth values representing a depth of the pixel, determine an amplitude frame comprising pixels from the one or more raw depth images, the pixels having amplitude values representing a brightness of the pixel, determine a threshold based on the amplitude values of the pixels of the amplitude frame, identify the depth value of a first pixel of the depth frame as valid and using the depth value of the first pixel of the depth frame for determining the depth of the one or more spatial features when the amplitude value of a corresponding first pixel of the amplitude frame is above the threshold, and identify the depth value of the first pixel of the depth frame as invalid and excluding the depth value of the first pixel of the depth frame from use for determining the depth of the one or more spatial features when the amplitude value of the corresponding first pixel of the amplitude frame is not above the threshold.

In another aspect, the one or more processors are configured to prepare a rendering of the imagery including the one or more spatial features and the depth of the one or more spatial features; and the electronic device includes a display for displaying the rendering of the imagery including the one or more spatial features and the depth of the one or more spatial features.

Much of the inventive functionality and many of the inventive principles described above are well suited for implementation with or in software programs or instructions and integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The blocks of the flowcharts depicted above can be in any order unless specified otherwise, and blocks may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   capturing one or more raw depth images using a time-of-flight camera of an electronic device;
   determining, by one or more processors of the electronic device, a depth frame from the one or more raw depth images, the depth frame comprising an array of pixels, each pixel of the depth frame having a depth value;
   determining, by the one or more processors of the electronic device, an amplitude frame from the one or more raw depth images, the amplitude frame comprising an array of pixels, each pixel of the amplitude frame having an amplitude energy value;
   determining, by the one or more processors of the electronic device, a first energy threshold value based on the amplitude energy values of the array of pixels of the amplitude frame;
   determining, by the one or more processors of the electronic device, for each of the amplitude energy values of the amplitude frame, a corresponding confidence value representing a corresponding validity of a depth represented by the depth value of a corresponding pixel of the depth frame, based on a comparison of the amplitude energy value of the pixel of the amplitude frame to the first energy threshold value;
   filtering the array of pixels of the amplitude frame based on the confidence values; and
   identifying spatial features in imagery captured by a visible light camera of the electronic device based on the filtered array of pixels.

2. The method of claim 1, wherein determining the first energy threshold value based on the amplitude energy values of the array of the pixels of the amplitude frame comprises:
   determining an estimated pixel energy value for the amplitude frame based on the amplitude energy values of the amplitude frame; and
   setting the first energy threshold value based on the estimated pixel energy value for the amplitude frame.

3. The method of claim 2, wherein determining the estimated pixel energy value for the amplitude frame based on the amplitude energy values comprises:
   determining a sum of the amplitude energy values for the pixels of the amplitude frame; and
   determining the estimated pixel energy to be an average amplitude energy value for the sum.

4. The method of claim 2, wherein determining the estimated pixel energy value for the amplitude frame based on the amplitude energy values comprises:
   generating a cumulative distribution function based on the amplitude energy values for the pixels of the amplitude frame; and
   determining the estimated pixel energy value to be a value such that a specified percentage of the pixels of the amplitude frame have an amplitude energy value equal or less than the value.

5. The method of claim 2, wherein the first energy threshold value is a specified percentage of the estimated pixel energy value.

6. The method of claim 2, wherein the first energy threshold value is less than the estimated pixel energy value.

7. The method of claim 1, wherein the filtering comprises:
   identifying the amplitude energy value of a first pixel of the amplitude frame as invalid when the amplitude energy value of the first pixel of the amplitude frame is less than the first energy threshold value.

8. The method of claim 1, filtering comprises:
   identifying a first pixel of the amplitude frame as valid when the amplitude energy value of the first pixel is greater than or equal to the first energy threshold value.

9. The method of claim 1, wherein filtering comprises:
   identifying the corresponding pixel of the depth frame as invalid for use in depth sensing when the amplitude energy value of a first pixel of the amplitude frame is below the first energy threshold value.

10. The method of claim 1, further comprising:
    setting a second energy threshold value based on the amplitude energy values of the amplitude frame; and
    wherein determining the confidence value further comprises:
    characterizing the corresponding pixel of the depth frame based on the amplitude energy value of a first pixel of the amplitude frame compared to the second energy threshold value.

11. An electronic device comprising:
    a time of flight (ToF) camera to capture one or more raw depth images; and
    a processor configured to:
    determine a depth frame from the one or more raw depth images, the depth frame comprising an array of pixels, each pixel of the depth frame having a depth value;
    determine an amplitude frame from the one or more raw depth images, the amplitude frame comprising an array of pixels, each pixel of the amplitude frame having an amplitude energy value;

determine a first energy threshold value based on the amplitude energy values of the pixels of the amplitude frame; and determine, for each pixel of the array of pixels of the amplitude frame, a corresponding confidence value representing a corresponding validity of a depth represented by the depth value of a corresponding pixel of the depth frame, based on a comparison of the amplitude energy value of the corresponding pixel of the amplitude frame to the first energy threshold value;

filter the array of pixels of the amplitude frame based on the confidence values; and identify spatial features in imagery captured by a visible light camera of the electronic device of the electronic device based on the filtered array of pixels.

12. The electronic device of claim 11 wherein the processor is further configured to:
determine an estimated pixel energy value for the amplitude frame based on the amplitude energy values of the amplitude frame; and
set the first energy threshold value based on the estimated pixel energy value for the amplitude frame.

13. The electronic device of claim 12 wherein the processor is further configured to
determine a sum of the amplitude energy values for the pixels of the amplitude frame; and
determine the estimated pixel energy value to be an average amplitude energy value for the sum.

14. The electronic device of claim 12 wherein the processor is further configured to
generate a cumulative distribution function based on the amplitude energy values for the pixels of the amplitude frame; and
determine the estimated pixel energy value to be a value such that a specified percentage of the pixels of the amplitude frame have an amplitude energy value equal or less than the value.

15. The electronic device of claim 11 wherein the processor is configured to filter by identifying the depth value of a pixel of the depth frame as invalid for use in depth sensing when the amplitude energy value of a first pixel of the amplitude frame is below the first energy threshold value.

16. The electronic device of claim 11, wherein the processor is configured to filter by abstaining from using a corresponding first pixel of the depth frame for depth sensing when the amplitude energy value of a first pixel of the amplitude frame is below the first energy threshold value.

17. The electronic device of claim 11 further comprising:
a display for displaying a rendering of the amplitude frame and imagery captured by a visible light camera of the electronic device.

18. A method for determining a depth of each of one or more spatial features in imagery captured by a visible light camera of an electronic device using one or more processors of the electronic device, the method comprising:
capturing one or more raw depth images using a depth sensor of the electronic device;
determining, by one or more processors of the electronic device, a depth frame comprising pixels from the one or more raw depth images, the pixels of the depth frame having depth values representing a depth of the pixel;

determining, by the one or more processors of the electronic device, an amplitude frame comprising pixels from the one or more raw depth images, the pixels of the amplitude frame having amplitude values representing a brightness of the pixel;

determining, by the one or more processors of the electronic device, a threshold based on the amplitude values of the pixels of the amplitude frame;

identifying the depth value of a first pixel of the depth frame as valid and using the depth value of the first pixel of the depth frame for determining the depth of the one or more spatial features when the amplitude value of a corresponding first pixel of the amplitude frame is above the threshold; and identifying the depth value of the first pixel of the depth frame as invalid and excluding the depth value of the first pixel of the depth frame from use for determining the depth of the one or more spatial features when the amplitude value of the corresponding pixel of the amplitude frame is not above the threshold.

19. The method of claim 18, wherein determining the threshold based on the pixel values of the pixels of the amplitude frame comprises:
determining an average pixel value for the amplitude frame; and
setting the threshold to be a specified percentage of the average pixel value.

20. The method of claim 18, wherein determining the threshold based on the amplitude values of the pixels of the amplitude frame comprises:
generating a cumulative distribution function based on the amplitude values for the amplitude frame; and
setting the threshold to be a value such that a specified percentage of pixels of the amplitude frame have amplitude value equal or less than the value.

21. An electronic device for determining a depth of each of one or more spatial features the electronic device comprising:
a visible light camera for capturing imagery including the one or more spatial features;
a depth sensor for capturing one or more raw depth images; and
one or more processors configured to:
determine a depth frame comprising pixels from the one or more raw depth images, the pixels of the depth frame having depth values representing a depth of the pixel;
determine an amplitude frame comprising pixels from the one or more raw depth images, the pixels having amplitude values representing a brightness of the pixel;
determine a threshold based on the amplitude values of the pixels of the amplitude frame;
identify the depth value of a first pixel of the depth frame as valid and using the depth value of the first pixel of the depth frame for determining the depth of the one or more spatial features when the amplitude value of a corresponding first pixel of the amplitude frame is above the threshold; and
identify the depth value of the first pixel of the depth frame as invalid and excluding the depth value of the first pixel of the depth frame from use for determining the depth of the one or more spatial features when the amplitude value of the corresponding first pixel of the amplitude frame is not above the threshold.

22. The electronic device of claim 21, wherein the one or more processors are configured to prepare a rendering of the imagery including the one or more spatial features and the depth of the one or more spatial features; and
the electronic device further comprising:
   a display for displaying the rendering of the imagery including the one or more spatial features and the depth of the one or more spatial features.

* * * * *

UNITED STATES PATENT AND TRADEMARK OFFICE
CERTIFICATE OF CORRECTION

PATENT NO. : 10,242,454 B2
APPLICATION NO. : 15/415724
DATED : March 26, 2019
INVENTOR(S) : Mirko Schmidt It is certified that error appears in the above-identified patent and that said Letters Patent is hereby corrected as shown below:

In the Claims

At Column 25 Line 17, Claim 11 correct "camera of the electronic device of the electronic device based on" to be --camera of the electronic device based on--

Signed and Sealed this
Nineteenth Day of November, 2019

Andrei Iancu
*Director of the United States Patent and Trademark Office*